United States Patent [19]
Young

[11] Patent Number: 5,923,516
[45] Date of Patent: *Jul. 13, 1999

[54] APPARATUS FOR PROTECTING ELECTRICAL AND ELECTRONIC EQUIPMENT AND ASSOCIATED METHOD

[75] Inventor: Danny J. Young, Plant City, Fla.

[73] Assignee: Rabun Labs, Inc., Plant City, Fla.

[ * ] Notice: This patent is subject to a terminal disclaimer.

[21] Appl. No.: 09/028,266

[22] Filed: Feb. 23, 1998

Related U.S. Application Data

[63] Continuation-in-part of application No. 08/635,169, Apr. 25, 1996, Pat. No. 5,721,659.

[51] Int. Cl.$^6$ .................................................. H02H 3/22
[52] U.S. Cl. ............................................ 361/111; 361/119
[58] Field of Search .............................. 361/56, 91, 111, 361/117, 119, 118

[56] References Cited

U.S. PATENT DOCUMENTS

| | | | |
|---|---|---|---|
| 3,753,117 | 8/1973 | Downing et al. | 325/364 |
| 4,016,428 | 4/1977 | Gutterman | 307/116 |
| 4,095,262 | 6/1978 | St. Clair | 361/1 |
| 4,276,576 | 6/1981 | Uman et al. | 361/1 |
| 4,493,975 | 1/1985 | Yamamoto | 219/370 |
| 4,550,273 | 10/1985 | Boettcher et al. | 315/151 |
| 4,782,355 | 11/1988 | Sakai et al. | 354/400 |
| 4,835,650 | 5/1989 | Epstein | 361/56 |
| 5,291,208 | 3/1994 | Young | 342/198 |
| 5,721,659 | 2/1998 | Young | 361/111 |

*Primary Examiner*—Sally C Medley
*Attorney, Agent, or Firm*—Allen, Dyer, Doppelt, Milbrath & Gilchrist, P.A.

[57] ABSTRACT

A protection apparatus includes a relay being switchable between a protected state and an operating state, and a controller for permitting a user to switch the relay to the operating state, and for switching the relay to the protected state responsive to a disturbance. Accordingly, the apparatus protects the electrical equipment from disturbances carried by the external electrical conductors. The apparatus preferably includes a housing which also serves to mount a plurality of electrical connectors for interfacing between the electrical equipment and the external electrical conductors. In one embodiment, the apparatus also preferably includes a lightning sensor for switching the relay to the protected state responsive to sensing of lightning. Alternately, or in addition, the apparatus may also include a power loss sensor for sensing a loss of power from the power source to the electrical equipment and for switching the relay immediately to the protected state responsive to sensing a loss of power. Multiple devices may be protected, and one or more timers may be used to switch the devices to the protected state. Surge suppression is preferably provided on the incoming AC power line to the apparatus.

18 Claims, 5 Drawing Sheets

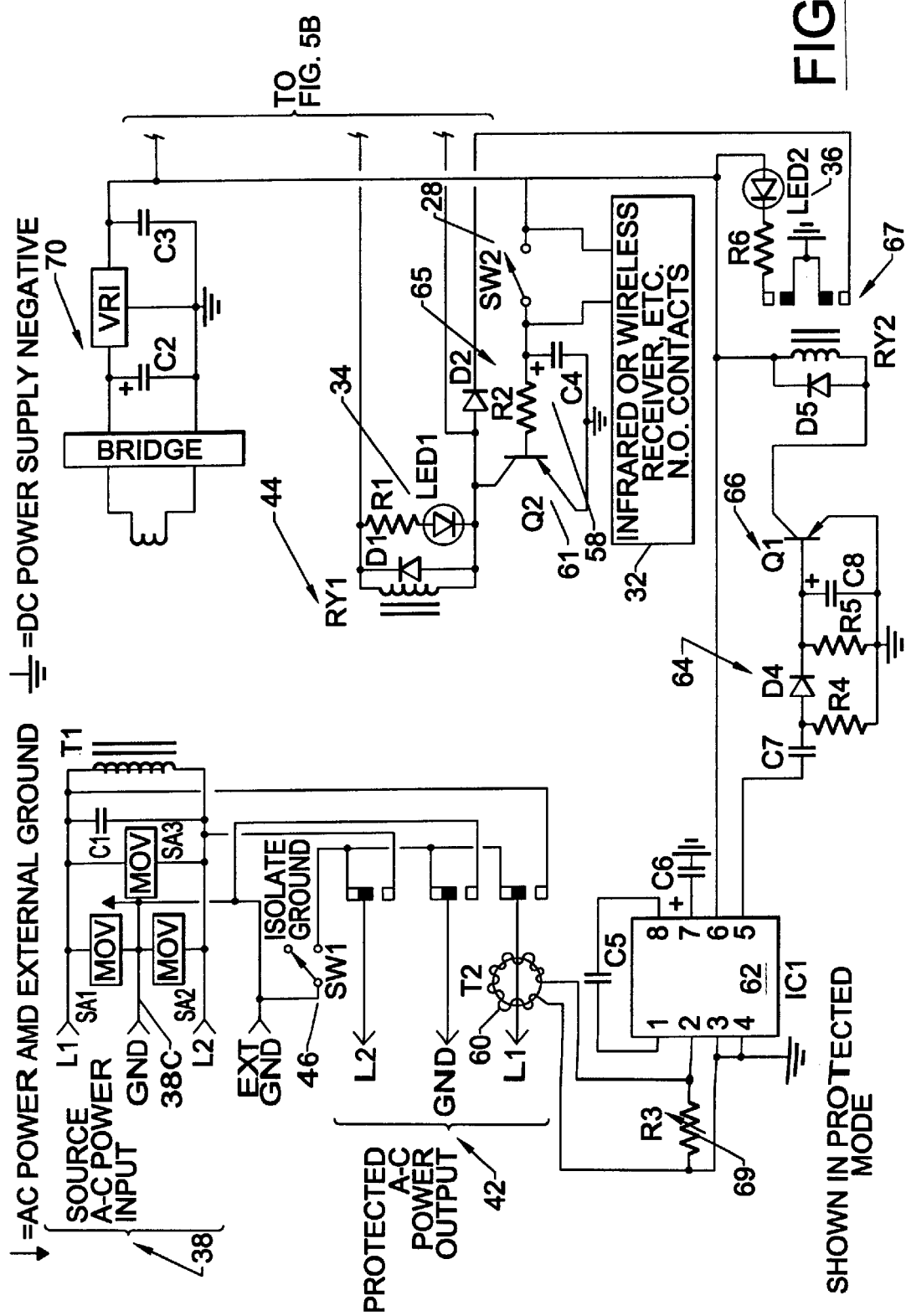

APPARATUS FOR PROTECTING ELECTRICAL AND ELECTRONIC EQUIPMENT AND ASSOCIATED METHOD

RELATED APPLICATIONS

The present application is a continuation-in-part application of U.S. patent application Ser. No. 08/635,169 filed Apr. 25, 1996, now U.S. Pat. No. 5,721,659.

FIELD OF INVENTION

The invention relates generally to protection equipment, and more particularly, to an apparatus and method for protecting electrical and electronic equipment from disturbances as may be carried by external conductors connected to the equipment.

BACKGROUND OF THE INVENTION

Many types of electrical and electronic equipment require connections via external conductors to a source of electrical power or other equipment. For example, many devices interface to external conductors, such as for communication over a telephone line, or connection to a remote antenna. Unfortunately, electronic equipment may also experience reduced reliability and even a catastrophic failure caused by surges or other disturbances carried to the equipment by coaxial, telephone, data, control, or power conductors connected to electronic equipment and its associated circuitry.

The disturbances are typically in the form of voltage and/or current spikes or surges that may result from transients on the power conductors, for example, caused by the switching on and off of large electrical loads sharing the power line. Irregularities in the power delivered by the utility company supplying the power may also cause potentially damaging disturbances. Lightning related surges may also be coupled to sensitive electronic equipment via external conductors. In addition, current surges caused by power system faults may also damage electrical and electronic equipment.

Many types of arresters, isolation transformers, and suppressors have been used in an attempt to provide protection from power line disturbances and lightning induced disturbances carried by external conductors. Conventional suppression devices typically do not provide a sufficient response time or have the energy dissipation capacity to adequately protect many types of electrical and electronic equipment. In other words, conventional protection devices may not provide a level of isolation and/or grounding necessary to fully protect the equipment to which they are connected.

One particularly difficult situation for conventional protection devices occurs from a ground potential rise caused by nearby lightning. Conventional protection devices may be ineffective against such a ground potential rise. Moreover, a common protection scheme is to connect the equipment to electrical ground, thus subjecting the equipment to the potentially damaging rising ground potential.

Some common types of protection devices are also turned off when the electronic equipment itself is not in use. Unfortunately, the electronic equipment is still subject to damage because of its external conductors are still connected and these conductors may carry potentially damaging electrical disturbances. Many types of conductors may carry undesirable disturbances including, for example, power, coaxial, telephone, data, and low voltage control lines.

It is often recommended that certain more sensitive electronic devices, such as a computer, a VCR, or a television, for example, be unplugged or disconnected from external conductors during extended periods of non-use or particularly when a lightning storm is forecast. Such methods while potentially effective if rigorously followed are usually inconvenient, impractical, or forgotten. Typically, one simply forgets to disconnect the electronic equipment.

U.S. Pat. No. 4,095,262 to St. Clair, for example, is directed to protecting household appliances, such as a TV, for example, from high voltages as may be caused by lightning. The apparatus includes a plurality of manually operated switches which may be connected for common operation. Accordingly, a user may manually switch the connections to isolate the equipment side conductors from the line and connect them to the chassis ground for protection. Unfortunately, the user must still remember and take the time to manually operate the switches prior to and after each use.

By way of further example, U.S. Pat. No. 4,276,576 to Uman et al. is directed to lightning protection of electronic or electrical equipment wherein the electronic equipment is moved to a protected state responsive to detection of nearby lightning or detection of a power outage. U.S. Pat. No. 5,291,208 to the present inventor, and assigned to the assignee of the present invention, describes a significant improvement in the area of lightning detection and equipment protection. These types of protection devices must first detect lightning or another disturbance before moving the electronic equipment to a protected state. Accordingly, accuracy and speed of detection are desirably combined with rapid switching to protect the equipment against lightning related disturbances.

SUMMARY OF INVENTION

In view of the foregoing background, it is therefore an object of the invention to provide an apparatus and associated method for protecting electrical and electronic equipment against potentially damaging disturbances carried to the equipment by external electrical conductors.

This and other objects, advantages and features of the present invention are provided by a protection apparatus which in one embodiment is for protecting a plurality of electrical equipment devices from electrical disturbances carried by external electrical conductors. The protection apparatus preferably comprises: a housing; connector means carried by the housing for connection with the external electrical conductors; and multiple device switching means positioned within the housing and operatively coupled to the connector means. The multiple device switching means is preferably switchable between a protected state and an operating state for each of the plurality of electrical equipment devices. The multiple device switching means when in the protected state is for isolating an equipment side of the external electrical conductors from a respective line side of the external electrical conductors, and when in the operating state is for connecting the line side of the external electrical conductors to the respective equipment side of the external electrical conductors.

The protection apparatus may also include disturbance sensing means positioned with the housing for sensing an electrical disturbance capable of affecting the plurality of electrical equipment devices. The disturbance may be lightning activity or a loss of power, for example.

The protection apparatus also preferably includes control means, positioned within the housing and operatively coupled to the multiple device switching means and the disturbance sensing means. The control means is for permitting a user to switch the multiple device switching means to the operating state for each of the electrical equipment devices, and for switching the multiple device switching means to the protected state responsive to a sensed disturbance to thereby protect the operating electrical equipment devices from a disturbance carried by the external electrical conductors.

The apparatus may also include power input means for receiving AC power from an AC power line. Moreover, the power input means may include surge suppression means for suppressing surges on the AC power line. The surge suppression means may include at least one metal oxide varistor. The power input means may further comprise means for suppressing electromagnetic interference on the AC power line. In addition, the surge suppression means may further comprise at least one relatively quick acting resettable fuse in series with the AC power line.

The control means may include wireless receiver means for receiving a plurality of control signals for respective electrical equipment devices. The control means may also include a plurality of timers for moving respective electrical equipment devices to the protected state after a selected time. In those embodiments where only a single device is to be protected, a single timer may be used.

The disturbance sensing means may comprise lightning sensing means for sensing lightning. Alternately, or in addition thereto, the disturbance sensing means may comprise power loss sensing means for sensing a loss of power.

Power consumption sensing means may cooperate with the multiple device switching means for switching at least one of the electrical equipment devices to the protected state a predetermined time after current consumption indicates that the electrical equipment device is no longer being use.

BRIEF DESCRIPTION OF DRAWINGS

FIGS. 5A and 5B is a schematic circuit diagram of the apparatus of the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited the embodiments set forth herein. Rather, these embodiments are provided so that this disclosure will be thorough and complete, and will fully convey the scope of the invention to those skilled in the art. Like numbers refer to like elements throughout.

Figure 1:
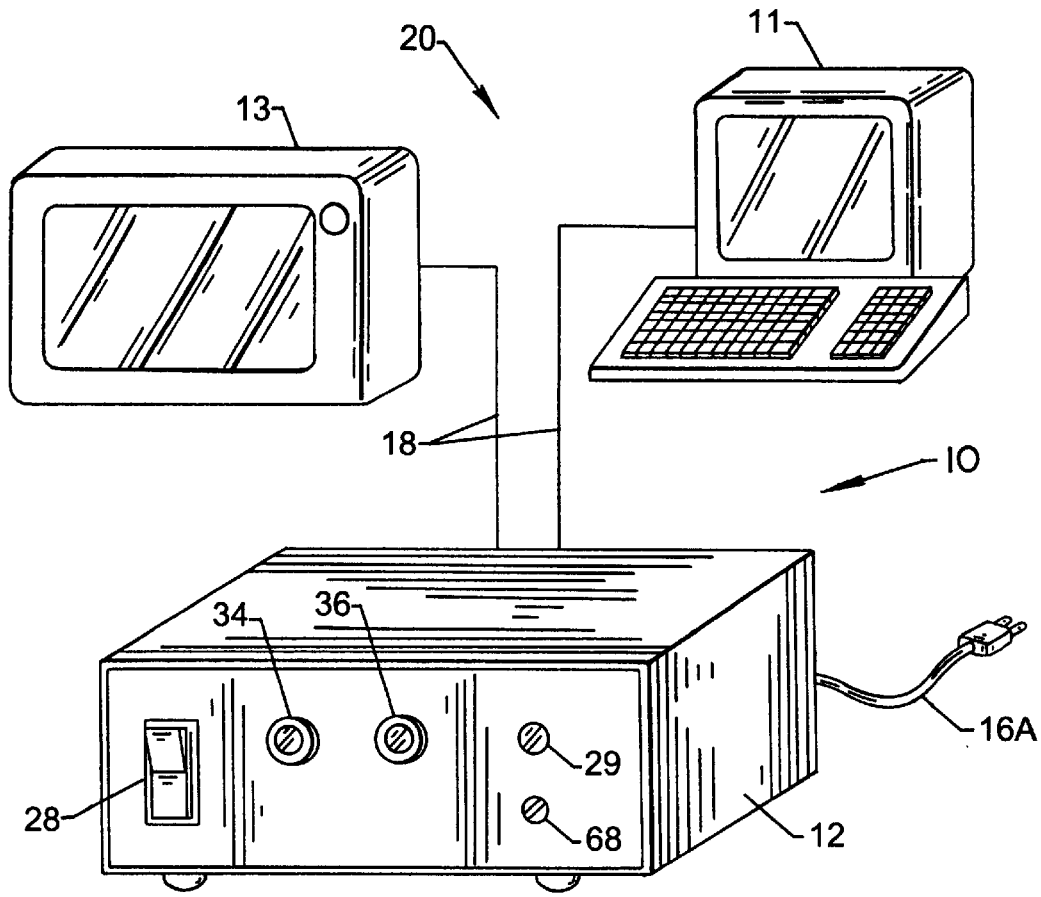
FIG. 1 is a front perspective view of the protection apparatus of the present invention coupled to a personal computer and a television.
Figure 2:
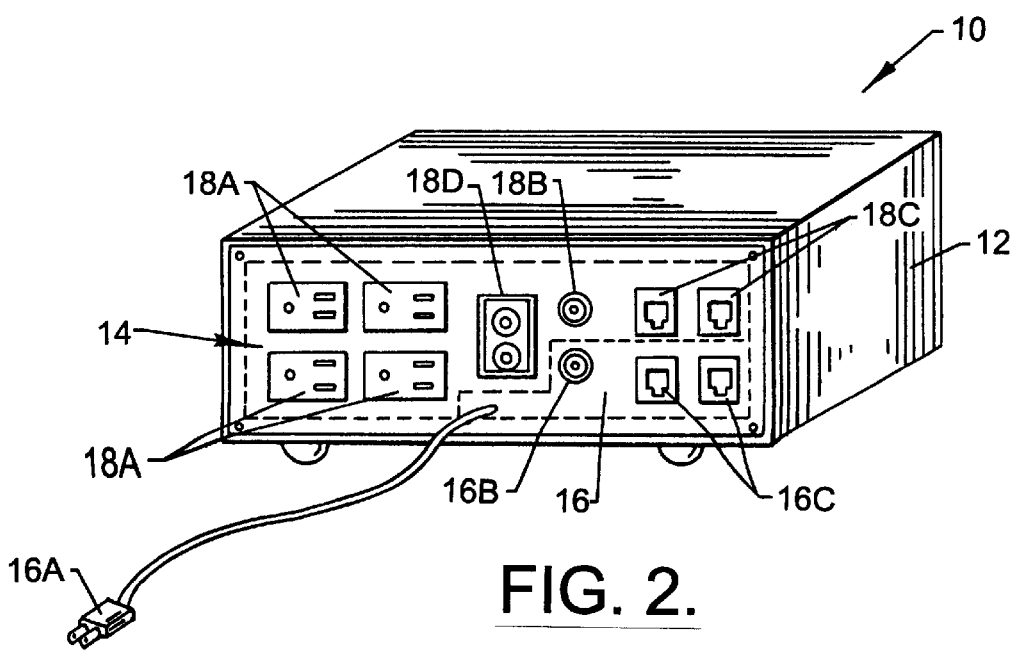
FIG. 2 is a rear perspective view of the apparatus of the present invention.
Figure 3:
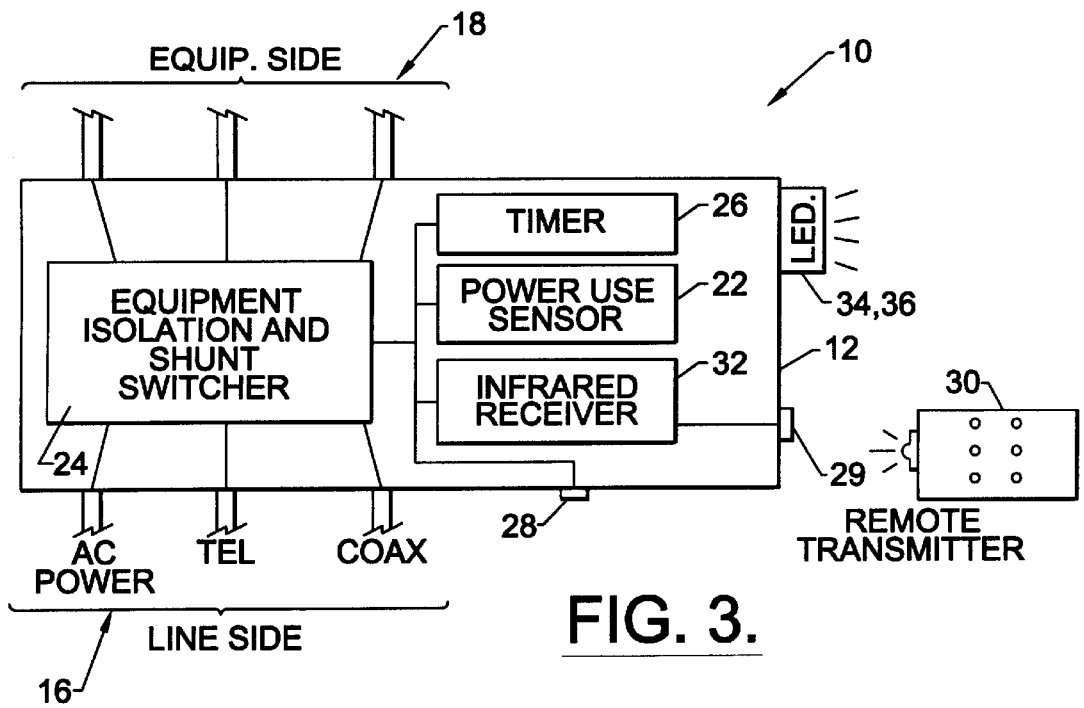
FIG. 3 is a functional block diagram of the apparatus further illustrating a remote transmitter.

Referring now initially to FIGS. 1–3, an electrical equipment protection apparatus 10 in accordance with the present invention is first described. The protection apparatus 10 comprises a housing 12 for containing the components and for mounting a plurality of electrical connectors 14 which, in turn, establish connections to the line side 16 and equipment side 18 of various external electrical conductors. Such external electrical conductors are commonly used for electrical equipment 20, such as the illustrated personal computer 11 and television receiver 13, for example, as would be readily understood by those skilled in the art.

Referring more particularly to FIG. 3, a power use or power consumption sensor 22 is positioned within the housing 12 for sensing power consumption of the electrical equipment 20. Power consumption by the electrical equipment 20 indicates that the equipment is in use, while if the power consumption sensed were zero, the equipment would typically not be in use and would be turned off. Switching means provided by the schematically illustrated switcher 24 is also positioned within the housing 12 and is responsive to the power consumption sensor 22. The switcher 24 connects line sides of the external conductors 16 to equipment sides of the external conductors 18 when the apparatus 10 is in the operating mode. Accordingly, power and other connections are established and maintained to operate the electrical equipment 20 when in the operating mode.

When sensed power consumption indicates that the electrical equipment 20 is not being used, the switcher 24 disconnects the line and equipment sides of the external conductors so that the apparatus 10 is in a protected state or mode with the electrical equipment being isolated to the external conductors. Accordingly, electrical disturbances or surges, such as from lightning or power system faults, cannot be coupled from the electrical equipment 20 via the external conductors.

The electrical equipment 20 may be powered from the protection apparatus 10 through the illustrated AC power cord 16A. In addition, coaxial connectors 16B, and modem and telephone jacks 16C, and/or a DC connector 16D may also be provided, carried by the housing 12, and operatively coupled to the switcher 24.

To initially switch the apparatus 10 to the operating mode a timer 26 is initially triggered by depressing the manually operable switch 28, for example. The timer 26 maintains the switcher 24 in the operating state even though the electrical equipment 20 has not yet been turned on, and, hence, the current or power sensor 22 is not yet indicating power flow. In other words, the timer 26 defines a start-up operating state for the apparatus. In an alternate embodiment of the invention, a remote infrared transmitter 30 is used to activate the timer 26 through the illustrated infrared receiver 32 which includes an optical detector 29. Infrared remote control transmitters and receivers are widely used in the area of house entertainment component control, as would be readily understood by those skilled in the art. As would also be readily understood by those skilled in the art, other types of wired or wireless remote transmitters may also be used in accordance with the invention.

A first or start-up state LED 34 lights alerting the user, and the user must turn on the connected equipment 20 before the timer 26 times out and the apparatus 10 moves to the protected state with the equipment 20 being disconnected. The timer 26 is typically set for about thirty seconds. Once the equipment 20 is powered up, a second or state indicating LED 36 may be illuminated to indicate the apparatus is in the operating state. The length of the time period may be set by a potentiometer 69 (FIGS. 1 and 5A). The power consumption sensor 22, monitors power used by the equipment.

If the electrical equipment 20 is turned off, the power sensor 22 will cause the switcher 24 to disconnect the equipment 20. Accordingly, the equipment 20 is protected from potential surges when not in use.

Figure 4:
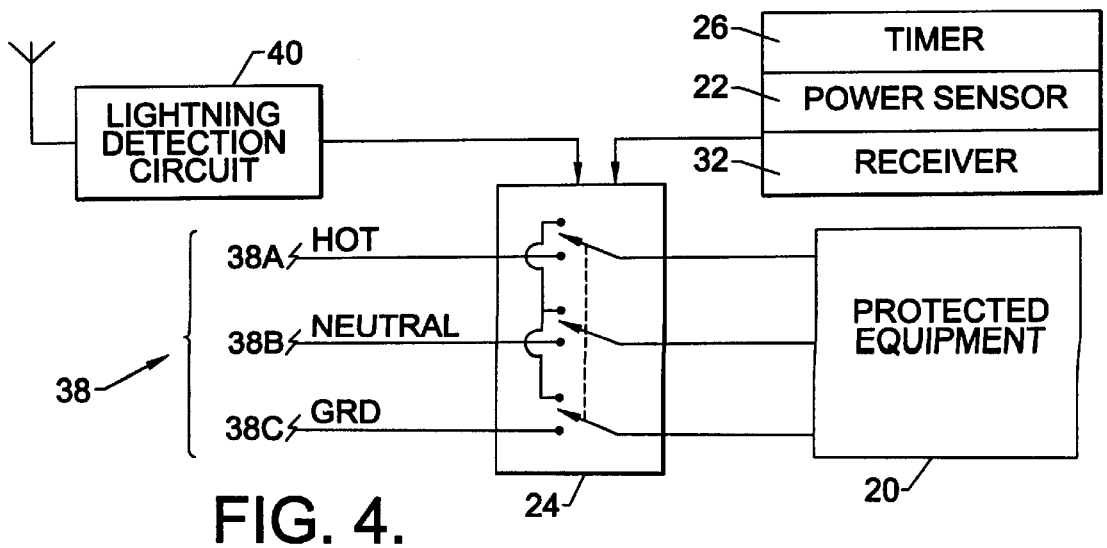
FIG. 4 is a functional block diagram of another embodiment of apparatus including a lightning sensing circuit.

As illustrated with reference to FIG. 4 another aspect of the invention is that the switcher 24 desirably immediately moves to the protected state based upon a loss of power, such as typically delivered via the AC power conductors 38. In other words, the switcher 24 may comprise a relay coil which drops the relay upon a loss of power supplied to the apparatus 10. Accordingly, the electrical equipment 20 is protected against any surges as may be caused, for example, as an automatic recloser on the utility power system attempts to clear a fault by periodically closing the substation breaker for the faulted line.

Yet another aspect of the invention is that the equipment side of all three AC power conductors, hot 38A, neutral 38B, and ground 38C are isolated from the line side, and the equipment side of the external conductors are shunted together. Conventional protection schemes typically ground all equipment side conductors. However, it has been found that it may be more desirable to leave the equipment conductors floating, or more preferably, to leave the conductors floating and shunt them together as illustrated, by way of example, with reference to FIG. 4. The equipment side of the other external electrical conductors may also be isolated from their respective line sides. Similarly, the equipment sides may be shunted together and left floating from ground. This reduces a likelihood of damage due to a low side surge that is not addressed by conventional protection devices, such as those using an MOV or gas discharge tubes, since these are ground referenced devices.

In other embodiments of the invention, it may be desirable to connect all of the shunted together line sides to an earth ground as would be readily understood by those skilled in the art.

As further illustrated with reference to FIG. 4, the switcher 24 may be driven by a lightning sensor 40 that will also cause the switcher to isolate and shunt together the equipment input and output lines 16, 18 upon the sensing or detection of lightning. For example, U.S. Pat. No. 5,291,208 to the present inventor, and assigned to the assignee of the present invention, describes a receiver and its associated circuitry suitable for detecting the nearby presence of potentially damaging lightning, and the entire disclosure of this patent is incorporated herein by reference in its entirety. Accordingly, the electrical equipment 20 may enjoy yet a further degree of protection from damage based upon nearby lightning causing disturbances or surges on the external electrical conductors. The timer 26, receiver 32, and switch 28 along with associated circuitry described below define control means for moving the switcher 24 between protected and operating states.

Figure 5B:
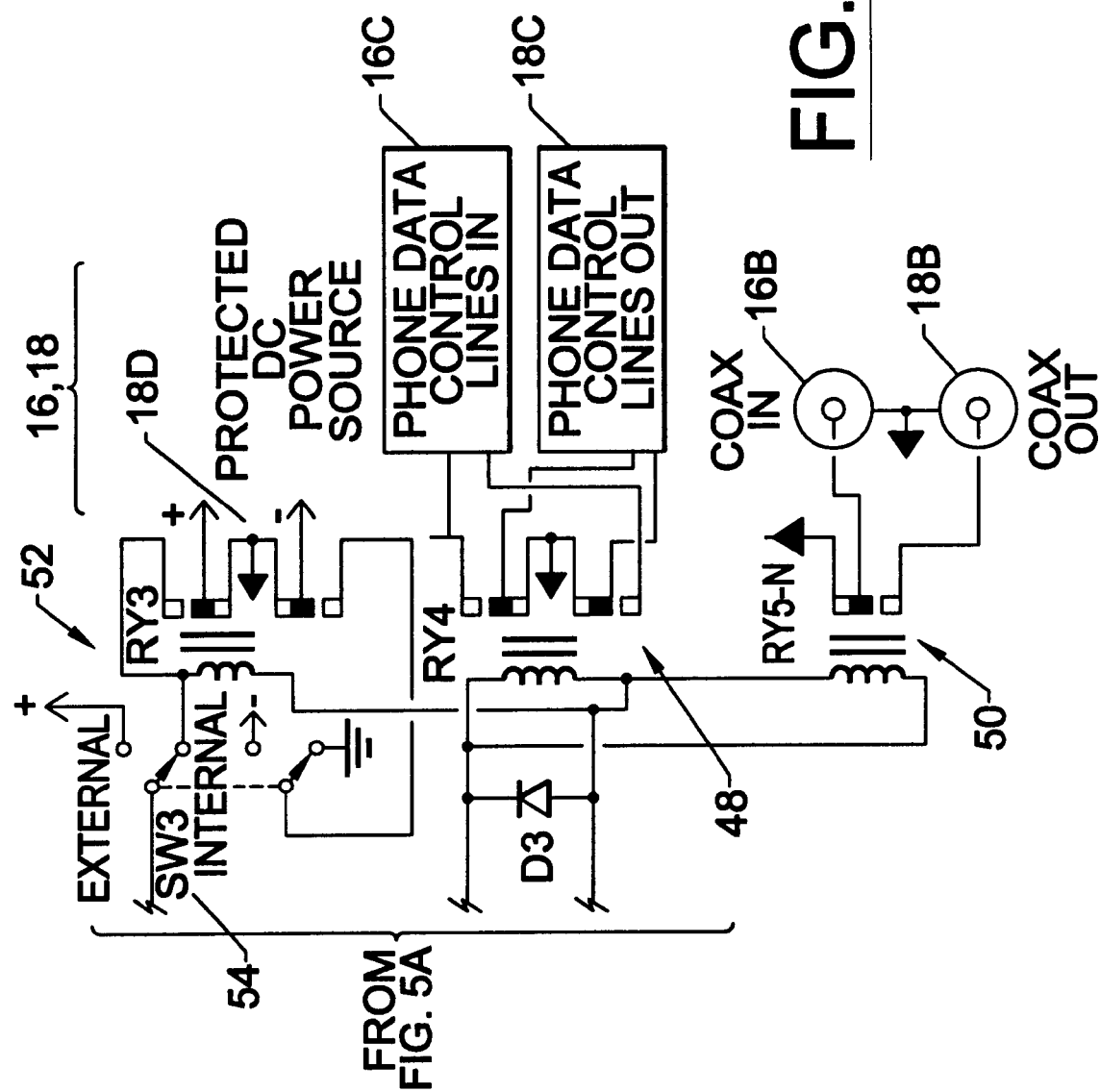

Turning now to the circuit schematic diagram of FIGS. 5A and 5B, the apparatus 10 is further described and illustrated in a protected state or mode. A source of AC power is supplied via the power connections 38 as earlier described with reference to FIG. 4 and delivers AC power via conductors 42 to the electrical equipment 20. The source power is supplied or disconnected via relay RY1 designated as numeral 44 which in the preferred embodiment is a 3PDT relay. The relay 44 disconnects and isolates the electrical equipment 20 connected through the power connections 38. Further, this relay isolates the equipment 20 from ground 38C to prevent damage from low side surges, in other words, surges that are predominately present on the ground conductor 38C, typically from nearby lightning strikes being dissipated into the earth and conducted to equipment ground connections.

As further illustrated with reference to FIGS. 5A and 5B, the protected AC power 42 to the electrical equipment 20 is isolated from the source 38 and lines shunted together to prevent a surge from entering the equipment should the surge arc across a contact gap in the relay 44 when in the protected mode. When in this protected mode, a switch SW1, identified by numeral 46 provides an option of placing the equipment power input 42 at ground potential in addition to isolating and shunting. Again, should the surge jump the gap of the relay 44, the surge would be directed to ground and not to the electrical equipment 20. In typical operation, equipment electrical ground continuity is maintained for safety purposes.

The same methodology of protecting equipment from surges in the power conductors or lines is used for signal lines by the disconnecting, shunting, and/or grounding the external conductors coupled via coax connectors 16B, 18B, telephone and/or data connectors 16C, 18C, and other external conductors in general. When AC power is disconnected, shunting and grounding as earlier described for power are performed for the signal lines in a similar manner using relays RY4 and RY5, identified with numerals 48 and 50, respectively.

Commercial and industrial configurations may be desirable where equipment or components are powered by a DC power source operated in conjunction with the AC powered equipment, such as is in remote located switching and isolating relays. Such a configuration may also benefit from protection provided by the apparatus 10 in accordance with the invention as would be readily understood by those skilled in the art. The relay RY3, numeral 52, provides for such protection where a DC power source is disconnected, isolated, and the equipment side conductors are shunted together to ground, simultaneously with the AC power and other electrical conductors.

In one embodiment of the present invention, provision is made for an external DC power supply via SW3, numeral 54, in the event the internal power supply of the apparatus 10 does not offer the required voltage or current needed. In operation, the electrical equipment 20 is connected to the apparatus 10, as earlier described; switch SW2, numeral 28, is manually operated or remotely controlled, also as earlier described via remote transmission methods. Normally open contacts as illustrated with reference to those described in FIGS. 5A and 5B, are momentarily closed, at which time capacitor C4, numeral 58, is charged causing transistor Q2, numeral 60, to be forward biased. This in turn provides a coil voltage for relays 44, 48, 50, and 52, which connects the equipment 20 to all external electrical conductors or lines (AC & DC power, coax, telephone, data, control, and any others incorporated into the apparatus) and is indicated by an illuminated LED1, numeral 34.

At this point, the electrical equipment 20 is normally turned on for use, and the current draw from the AC power source, or the power consumption of the equipment, is detected, in part, by the toroid transformer T2, numeral 60. The output of the toroid transformer 60 is proportional to the amount of current drawn and is applied to an amplifier 62 which is rectified via circuit 64, and which DC voltage is then applied to the base of transistor Q1, numeral 66. When the voltage adjusted via resistor R3, numeral 69, is applied to the base of the transistor Q1, numeral 66, indicating that the equipment is consuming power, the transistor Q1, is forward biased and relay RY2, numeral 67, is activated, as indicated by LED2 36.

All equipment electrical connections are maintained in the operating position (by the second set of contacts of relay RY2 67) as long as current is sensed by the toroid transformer 60. This condition will remain until the equipment 20 is turned off and current is no longer being drawn, at which time, the relays, as herein described, will automatically switch, disconnecting and isolating electrical connections to some or all external electrical conductors.

As further described with reference to FIGS. 5A and 5B, the apparatus 10 of the present invention has additional built-in safeguards. If equipment 20 is operating and the AC power source is lost, the relays drop out and revert to the disconnected and isolated positions, thus further protecting the equipment 20. In addition, if the switch SW2 28 or the remote controlled normally opened contacts are momentarily closed, but the equipment is not turned on within the predetermined time of approximately thirty seconds, the time constant of R2-C4 circuit 62 will be exceeded and the transistor Q2 61 will no longer be forward biased, thus causing the relays again to drop out and revert to the disconnected or protected state. This situation is particularly valuable where the apparatus 10 was either accidentally activated and the user was not planning to use the equipment, or if the apparatus was activated but the user was interrupted or distracted, thus exposing the electrical equipment 20 to possible damage.

The apparatus 10 in a preferred embodiment herein described provides a level of on-line protection through the three metal oxide varistors (MOV's) arranged in a preferred common-mode configuration 70, wherein noise on the AC line is filtered and attenuated by capacitor C1, prior to being applied to the electrical equipment 20. The apparatus 10 thus provides protection to equipment 20 such as a personal computer, by controlling the AC power and modem telephone line connections 16C, 18C. The apparatus 10 may also be used in a more complex setting in the home where an entertainment system includes AC power, coax and control connections for a TV, am-fm receivers, VCR and CATV or even a satellite receiving system when the equipment is powered-up, but isolates the lines to the equipment 20 when the equipment 20 is not in operation.

Figure 6:
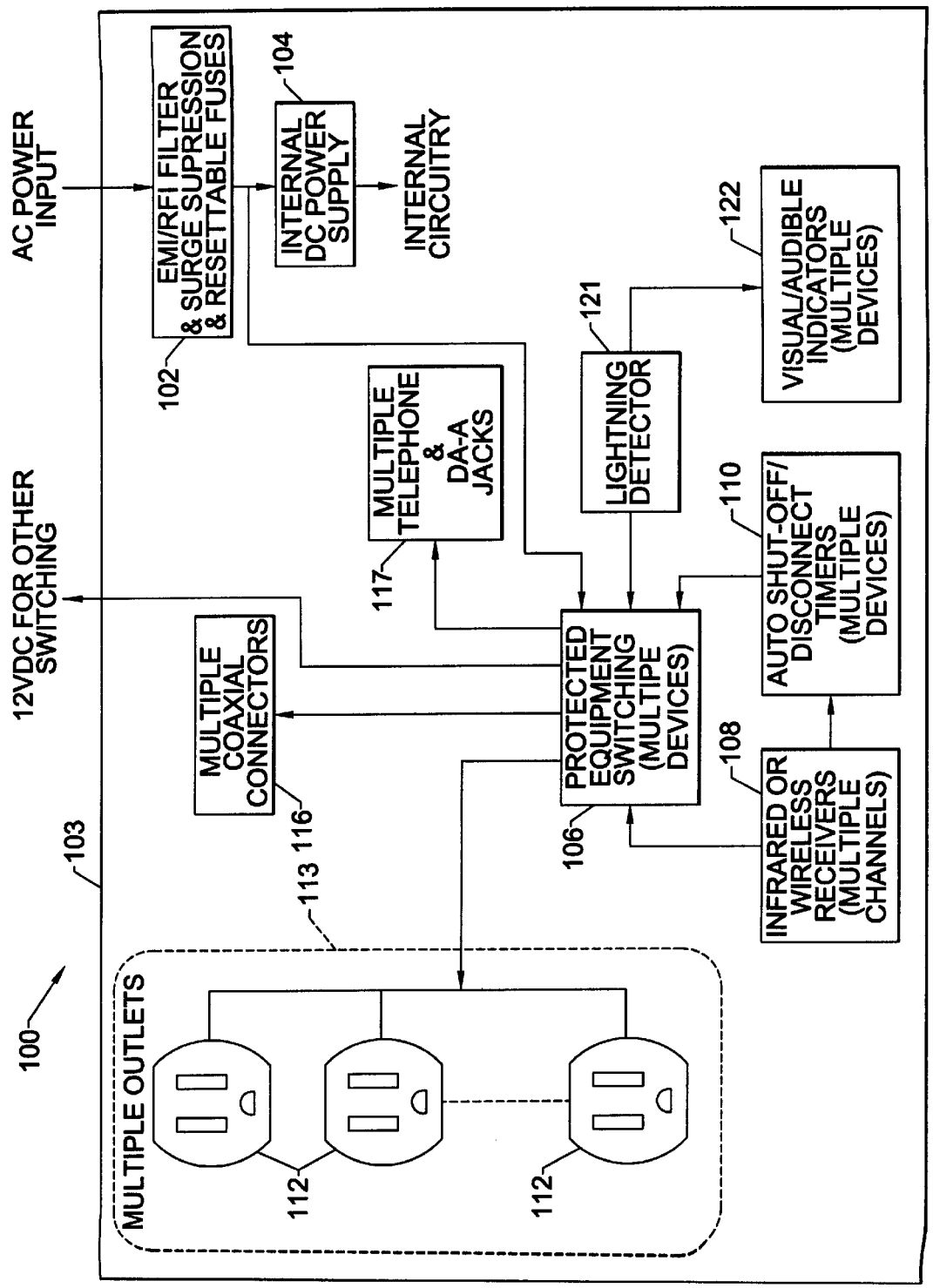
FIG. 6 is a functional block diagram of yet another embodiment of the apparatus in accordance with the present invention.

Turning now additionally to FIG. 6, another embodiment of the apparatus 100 is described that may be particularly beneficial in a setting, such as a home entertainment system, where not all of the equipment is in use at a given time. In other words, some of the equipment may be operating, and other equipment may desirably be in a protected mode. In this embodiment, AC power is input initially to an input protection/filtering power circuit 102 that provides EMI/RFI filtering, power surge suppression, and which also advantageously includes so-called "resettable fuses". Such a resettable fuse is available, for example, from Keystone Thermometrics of St. Marys, Pa. Downstream from the input/filtering power circuit 102 an internal DC power supply 104 provides power to the various internal circuitry as will be appreciated by those skilled in the art. Of course, the apparatus 100 may include the schematically illustrated housing 103.

In the illustrated embodiment, the switching may be provided for multiple devices. In particular, the apparatus 100 includes the protected equipment switching block 106 which can individually operate some or all of the connected equipment. This operation may be responsive to the infrared or wireless receivers 108 which have the capability for multiple channels or codes for respective different devices. Of course, the different devices may be connected to respective desired ones of the illustrated AC outlets 112 in the bank of outlets 113. Banks of coaxial connectors 116, and telephone/data connectors 117 are similarly arranged and configured for multiple device operation as will be readily appreciated by those skilled in the art.

The schematically illustrated lightning detector 121 and audible/visual indicators 122 may operate as described as above to cause switching to the protected state and/or provide indications of approaching storms. In addition, upon loss of AC input power the switching block 106 may move to the protected state or position. Accordingly, these circuit portions require no further descriptions herein.

Yet another aspect of the apparatus 100 is that one or more timers 110 may be included to cause the connected protected equipment to switch to the protected state after a predetermined time, such as may typically be set in increments of half-hours, for example. The different pieces of connected equipment to be protected may be set to switch to the protected state at different time intervals. This timing feature may be used by itself and/or in combination with the power sensing and disturbance sensing features described above as will be appreciated by those skilled in the art. Accordingly, the apparatus 100 may be used in a home entertainment setting wherein a stereo may be desirably moved to the protected state, while a satellite receiver may be desirably operated when feeding a television in another room, for example. Those of skill in the art will readily envision many other similar scenarios which are also contemplated by the present invention.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A protection apparatus for protecting a plurality of electrical equipment devices from electrical disturbances carried by external electrical conductors, said protection apparatus comprising:

a housing;

connector means carried by said housing for connection with the external electrical conductors;

multiple device switching means positioned within said housing and operatively coupled to said connector means and being switchable between a protected state and an operating state for each of the plurality of electrical equipment devices, said multiple device switching means when in the protected state isolates an equipment side of the external electrical conductors from a respective line side of the external electrical conductors, said multiple device switching means when in the operating state connects the line side of the external electrical conductors to the respective equipment side of the external electrical conductors;

disturbance sensing means positioned within said housing for sensing a disturbance capable of affecting the plurality of electrical equipment devices; and control means, positioned within said housing and operatively coupled to said multiple device switching means and said disturbance sensing means, for permitting a user to switch said multiple device switching means to the operating state for each of said electrical equipment devices, and for switching said multiple device switching means to the protected state responsive to a sensed disturbance to thereby protect the operating electrical equipment devices.

2. A protection apparatus according to claim 1 further comprising power input means for receiving AC power from an AC power line; and wherein said power input means comprises surge suppression means for suppressing surges on the AC power line.

3. A protection apparatus according to claim 2 wherein said surge suppression means comprises at least one metal oxide varistor.

4. A protection apparatus according to claim 2 wherein said power input means further comprises electromagnetic interference (EMI) suppression means for suppressing EMI on the AC power line.

5. A protection apparatus according to claim 2 wherein said surge suppression means further comprises at least one relatively quick acting resettable fuse in series with the AC power line.

6. A protection apparatus according to claim 1 wherein said control means further comprises wireless receiver means for receiving a plurality of control signals for respective electrical equipment devices.

7. A protection apparatus according to claim 1 wherein said control means further comprises a plurality of timers for moving respective electrical equipment devices to the protected state after a predetermined time.

8. A protection apparatus according to claim 1 wherein said disturbance sensing means comprises lightning sensing means for sensing lightning.

9. A protection apparatus according to claim 1 wherein said disturbance sensing means comprises power loss sensing means for sensing a loss of power.

10. A protection apparatus according to claim 1 further comprising power consumption sensing means cooperating with said multiple device switching means for switching at least one of the electrical equipment devices to the protected state a predetermined time after current consumption indicates that the electrical equipment device is no longer being used.

11. A protection apparatus for protecting an electrical equipment device from electrical disturbances carried by external electrical conductors, said protection apparatus comprising:

a housing;

connector means carried by said housing for connection with the external electrical conductors;

switching means positioned within said housing and operatively coupled to said connector means and being switchable between a protected state and an operating state for the electrical equipment device, said switching means when in the protected state isolates an equipment side of the external electrical conductors from a respective line side of the external electrical conductors, said switching means when in the operating state connects the line side of the external electrical conductors to the respective equipment side of the external electrical conductors;

disturbance sensing means positioned with said housing for sensing a disturbance capable of affecting the electrical equipment;

control means, positioned within said housing and operatively coupled to said switching means and said disturbance sensing means, for permitting a user to switch said switching means to the operating state for the electrical equipment, and for switching said switching means to the protected state responsive to a sensed disturbance to thereby protect the operating electrical equipment from a disturbance carried by the external electrical conductors, said control means further comprising at least one timer for moving the electrical equipment to the protected state after a predetermined time; and power input means for receiving AC power from an AC power line, said power input means comprising surge suppression means for suppressing surges on the AC power line.

12. A protection apparatus according to claim 11 wherein said surge suppression means comprises at least one metal oxide varistor.

13. A protection apparatus according to claim 11 wherein said power input means further comprises electromagnetic interference (EMI) suppression means for suppressing EMI on the AC power line.

14. A protection apparatus according to claim 11 wherein said surge suppression means further comprises at least one relatively quick acting resettable fuse in series with the AC power line.

15. A protection apparatus according to claim 11 wherein said control means further comprises wireless receiver means for receiving a control signal for the electrical equipment.

16. A protection apparatus according to claim 11 wherein said disturbance sensing means comprises lightning sensing means for sensing lightning.

17. A protection apparatus according to claim 11 wherein said disturbance sensing means comprises power loss sensing means for sensing a loss of power.

18. A protection apparatus according to claim 11 further comprising power consumption sensing means cooperating with said switching means for switching the electrical equipment device to the protected state a predetermined time after current consumption indicates that the electrical equipment is no longer being used.

* * * * *